May 13, 1958      O. KURZ      2,834,610

DEVICE FOR OPERATIVELY CONNECTING A DYNAMO WITH A WHEEL HUB

Filed Aug. 8, 1955      3 Sheets-Sheet 1

Inventor
Otto Kurz
by Eric E. Franke
Attorney

May 13, 1958     O. KURZ     2,834,610

DEVICE FOR OPERATIVELY CONNECTING A DYNAMO WITH A WHEEL HUB

Filed Aug. 8, 1955     3 Sheets-Sheet 2

Inventor
Otto Kurz
by Eric E. Franke
Attorney

May 13, 1958  O. KURZ  2,834,610
DEVICE FOR OPERATIVELY CONNECTING A DYNAMO WITH A WHEEL HUB
Filed Aug. 8, 1955  3 Sheets-Sheet 3

Inventor
Otto Kurz
by Eric E. Granke
Attorney

United States Patent Office 2,834,610
Patented May 13, 1958

2,834,610

DEVICE FOR OPERATIVELY CONNECTING A DYNAMO WITH A WHEEL HUB

Otto Kurz, Goppingen, Germany

Application August 8, 1955, Serial No. 526,844

6 Claims. (Cl. 280—289)

This invention relates to a device for operatively connecting a dynamo with a wheel hub which is associated with one of the road wheels of a two-wheel vehicle and mounted in the fork thereof wherein a transmission gearing is provided and mounted coaxial with the road wheel axis in a fixed carrier support between the armature of the dynamo and the associated road wheel.

An important object of the present invention is to provide a driving gear wheel for the transmission gearing which has external toothing formed integral therewith and which in addition is formed to serve as a brake drum for the brake of the vehicle.

Another object of the present invention is to provide the driving gear wheel with carrier dogs cooperating with the spokes of the road wheel for movement therewith.

A further object of the present invention is to provide a device of the type referred to which is of simple sturdy construction and wherein each of the parts is simple in form and easily manufactured.

With the above objects in view, the present invention consists of a device for operatively connecting a dynamo with a wheel hub which along with the device is mounted in the fork of a road wheel associated therewith.

According to the present invention the device comprises a transmission gearing with a driving gear wheel which is coaxially mounted as to the road wheel axis in a fixedly mounted carrier support and provided with incorporated carrier dogs adapted to cooperate with the spokes of the associated road wheel such that when the road wheel is propelled it will carry the driving gear wheel with it, the motion of which is transmitted directly through the transmission gearing to the armature of the dynamo.

This invention also consists in certain other features of construction and in the combination and arrangement of the several parts to be hereafter fully described, illustrated in the accompanying drawings and specifically pointed out in the claims.

Figure 1:
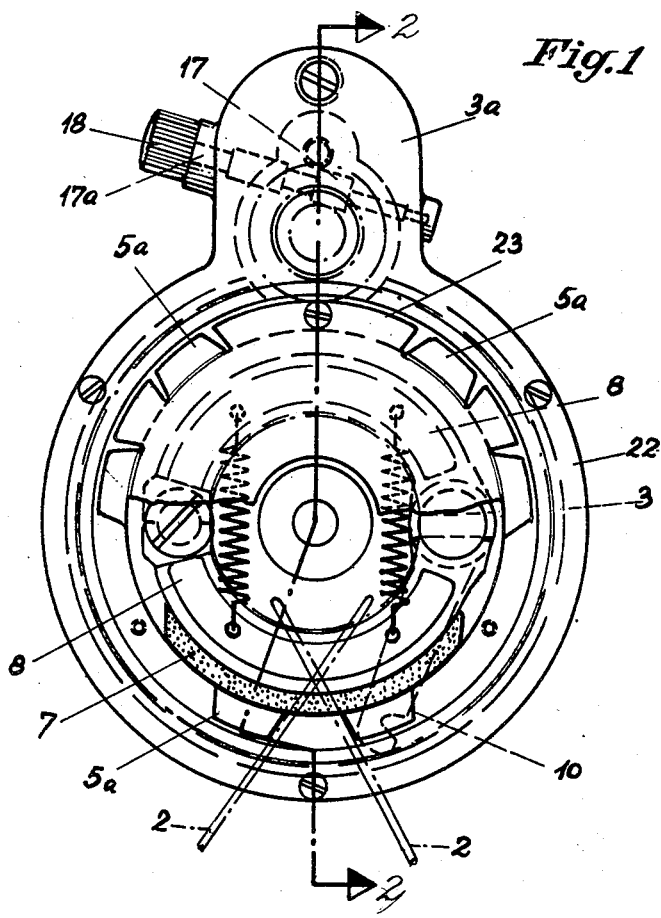
Figure 5:
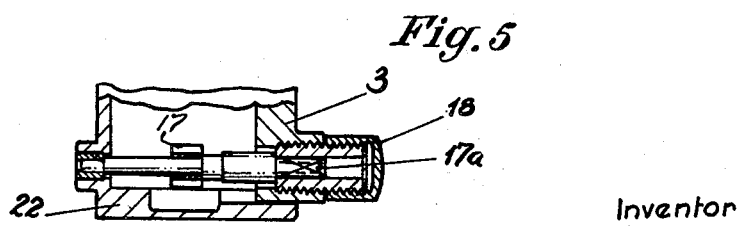
Figure 2:
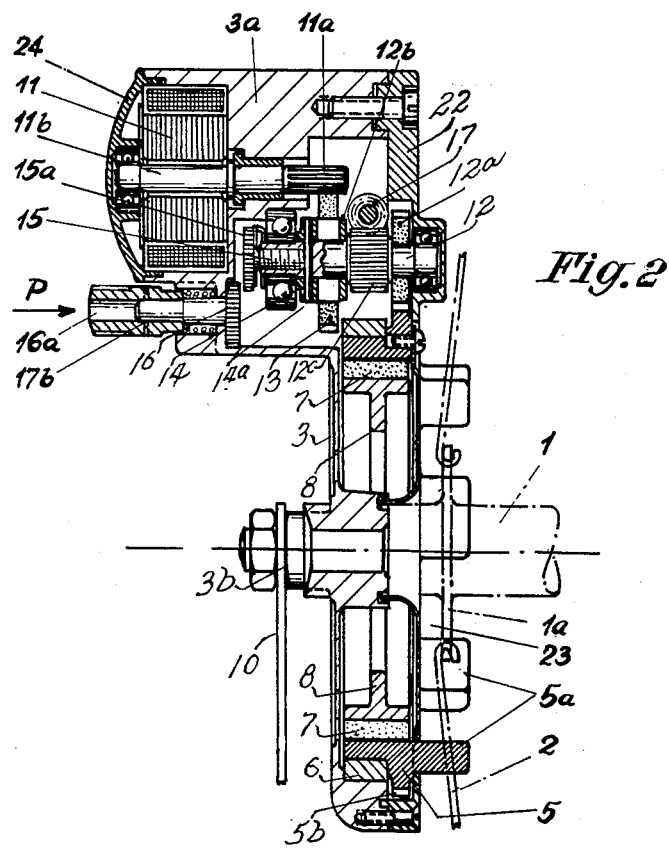
Figure 6:
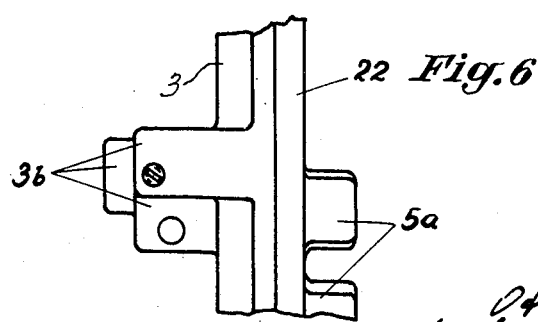
Figure 3:
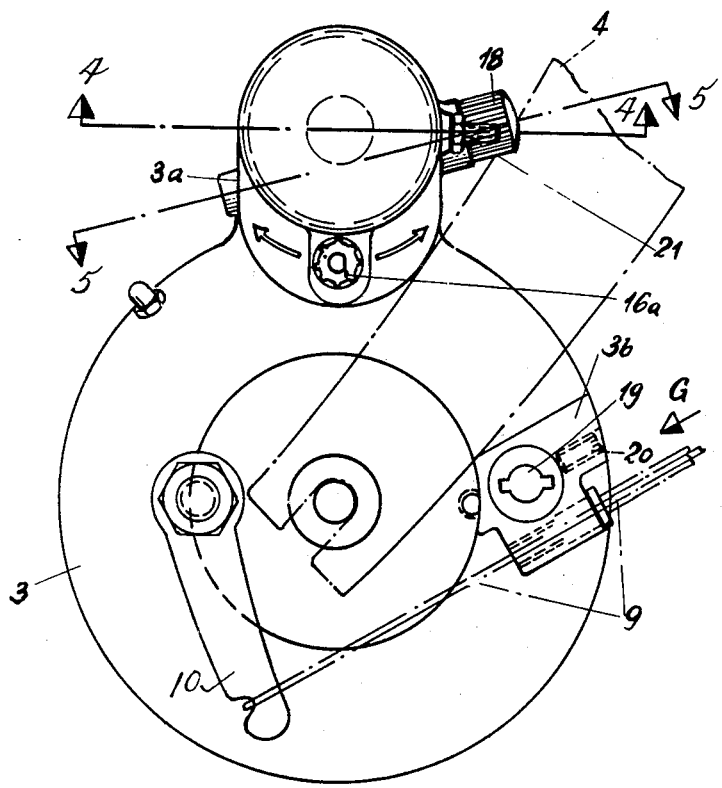
Figure 4:
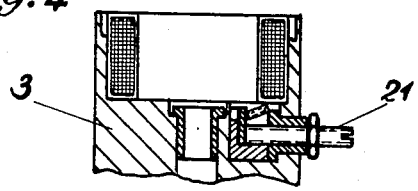

In describing the invention in detail, reference will be had to the accompanying drawings wherein like characters denote like or corresponding parts throughout the several views, and in which:

Fig. 1 is a side elevation showing the wheel side with the cover plate for the brake partly broken away for clarity of illustration, Fig. 2 is a section on the line 2—2 of Fig. 1, Fig. 3 is a side elevation showing the service side, Fig. 4 is a section on the line 4—4 of Fig. 3, Fig. 5 is a section on the line 5—5 of Fig. 3, and Fig. 6 is a view in direction of arrow G.

Referring to the drawings the numeral 1 designates a wheel hub in the road wheel axis R provided with a boss 1a to which the spokes 2 of the road wheel are hooked. The carrier support 3 for the device is mounted on the hub axle (not shown). The road wheel along with the device is in known manner mounted in the fork 4 of the bicycle which is secured on the hub axle by tommy screws, or the like.

Eyes 3a and 3b formed integral with the carrier support 3 abut against one of the two prongs of the fork 4 to thereby prevent the carrier support from turning. Carrier dogs 5a incorporated in the driving gear 5, which is provided with external toothing 5b, extend parallel to the road wheel axis R and cooperate with the spokes 2 of the road wheel in the manner of a dog coupling so as to drive the gear wheel 5 when the road wheel of the bicycle is propelled, the gear wheel 5 being rotatably mounted in a bronze bush 6 coaxial with the road wheel axis R. Brake shoes 8 of a shoe brake provided with brake lining 7 are in braking engagement with the cylindrical internal surface of the driving gear wheel 5 when the brake is applied by a Bowden cable 9 engaging a lever 10. The driving gear wheel 5 accordingly serves also as a brake drum.

Arranged between the armature 11 of the dynamo and the road wheel of the bicycle is a transmission gearing comprising the driving gear wheel 5 (spur gear), a spur gear 12a fixedly mounted on an intermediate shaft 12, a spur gear 13 rotatably supported on the intermediate shaft 12 and a pinion 11a incorporated in the shaft 11b. A disk clutch arranged between armature 11 and driving gear wheel 5 comprises spur gear 13 and friction disks 12b and 14. The friction disk 12b is rigidly secured on the intermediate shaft 12, whilst the friction disk 14 is axially movable in the extent of a gap through which a pin 14a extends such that the friction disk 14 engages the spur gear 13 and with it the friction disk 12b when the externally toothed member 15a incorporated with the screw 15 is turned in clockwise direction. For turning the member 15a and screw 15 serves a setting member 16 (gear wheel) which is brought into meshing engagement with the member 15a when a rotary knob 16a is axially shifted in direction P against the action of a spring 17b. Coupling of the armature 11 with the driving gear 5 to effect operation of the dynamo is brought about when the members 12a, 13 and 14 are in engagement with one another.

Thus it will be seen that in order to put the dynamo into service it is simply necessary to turn the knob 16a in clockwise direction after the setting member 16 has been brought into meshing engagement with the member 15a as hereinbefore described.

A speedometer drive gear comprising a worm 17 meshing with a wormwheel 12c which is rigidly mounted on the intermediate shaft 12 affords provision for connecting a speedometer. The worm 17 is mounted on a shaft whose end 17a is adapted for receiving the coupling of the flexible drive shaft of a speedometer (not shown) and to this end made accessible by a removable cap 18. The bore 19 affords provision for installing a cylinder lock which may be secured by a set screw 20 against removal. The numeral 21 designates a cable connection, whilst 22 and 23 designate parts of the frame and 24 an end shield forming the housing of the device.

It is thought from the foregoing description that the advantages and novel features of the invention will be readily apparent.

It is to be understood that changes may be made in the construction and in the combination and arrangement of the several parts provided that such changes fall within the scope of the appended claims.

What is claimed is:

1. A device for attachment to a wire wheel vehicle, such device comprising a frame fastened fixedly to the hub of one of the wire wheels, an externally toothed gear provided with an internal peripheral brake surface keyed to the axle of said wire wheel between said frame and said wire wheel, a plurality of cogs extending laterally from said gear to enter into driven contact with wires of the rotating wire wheel, a shoe brake provided with brake linings and means of expanding the brake shoes arranged to enter into braking engagement with the brake surface of said gear upon expansion of said brake shoes, a housing forming part of said frame provided eccentric to the axle of said wire wheel, a generator mounted within said housing, a gear train mounted within said housing which is operative by connecting said generator with said externally toothed gear, and means for moving said gear train in and out of operative contact with said generator.

2. A device according to claim 1, wherein said shoe brake is provided with a brake lever extending to a Bowden cable which, upon being activated, expands the shoes of said brake against the internal peripheral brake surface of said externally toothed gear.

3. A device according to claim 1, wherein said means for moving said gear train in and out of operative contact with said generator consists of a releasable clutch comprising an intermediate shaft, a pinion formed at the free end of the shaft of said generator, a spur gear mounted rotatably on said intermediate shaft in meshing contact with said pinion between a rigidly secured friction disk and an axially shiftable friction disk mounted on said intermediate shaft.

4. A device according to claim 3, wherein said shiftable friction disk has a screw associated therewith which extends axially in said intermediate shaft and exerts pressure upon a pin arranged on said shiftable friction disk and is shiftably arranged in a slot provided in said intermediate shaft.

5. A device according to claim 4, wherein said screw has an externally toothed member formed integral therewith which meshes with a turnable setting member in the form of a gear wheel and is turned thereby, said setting member being so adjustably arranged and spring-loaded by a tension spring that said spring will move it out of the range of said externally toothed member when said setting member whose outermost end is formed as a rotary knob, is released from engagement with said toothed member.

6. A device according to claim 3, wherein a speedometer drive gear adapted for connecting a flexible shaft leading to a speedometer is arranged on said intermediate shaft between said spur gears mounted thereon which preferably are made of pressed non-metallic material.

References Cited in the file of this patent

FOREIGN PATENTS

| | | |
|---|---|---|
| 153,035 | Australia | Sept. 1, 1953 |
| 84,683 | Norway | Oct. 9, 1954 |
| 224,818 | Switzerland | Apr. 1, 1943 |